(No Model.)

T. J. COX.
PORTABLE FLOUR AND MEAL BIN.

No. 359,347. Patented Mar. 15, 1887.

Witnesses
T. Walter Fowler
H. B. Applewhaite

Inventor
Thos. J. Cox
By his Attorneys
A. H. Evans & Co.

UNITED STATES PATENT OFFICE.

THOMAS JEFFERSON COX, OF GAINESVILLE, TEXAS.

PORTABLE FLOUR AND MEAL BIN.

SPECIFICATION forming part of Letters Patent No. 359,347, dated March 15, 1887.

Application filed June 23, 1886. Serial No. 206,051. (No model.)

*To all whom it may concern:*

Be it known that I, THOMAS JEFFERSON COX, of Gainesville, in the county of Cooke and State of Texas, have invented a new and useful Improvement in Portable Flour and Meal Bins, of which the following is a full, clear, and exact description, reference being had to the accompanying drawings, forming part of this specification, in which—

Figure 1:
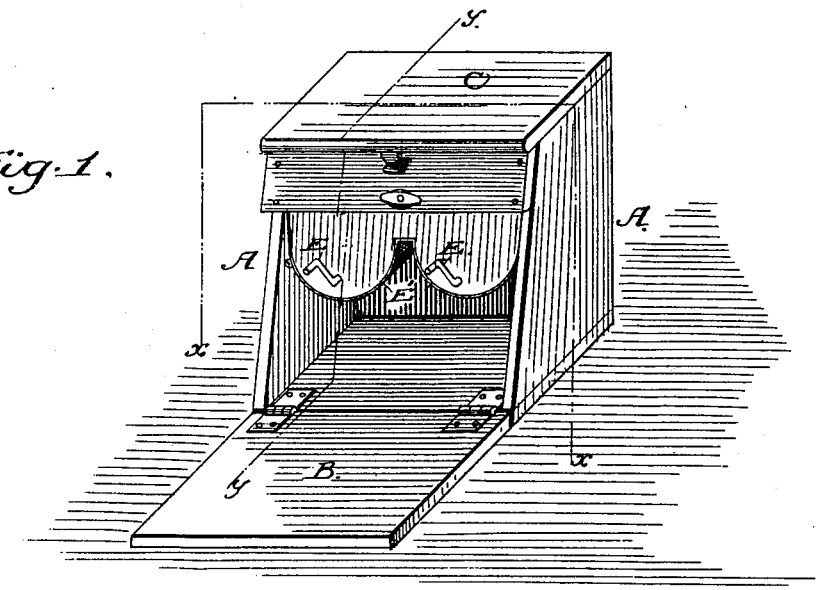
Figure 2:
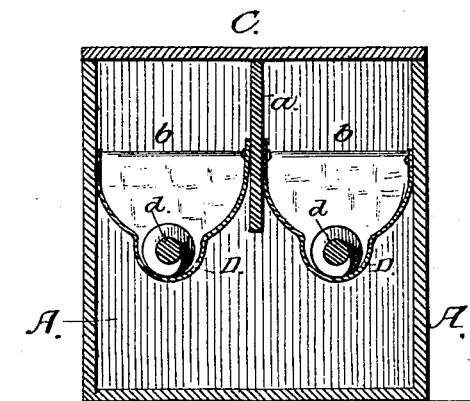
Figure 3:
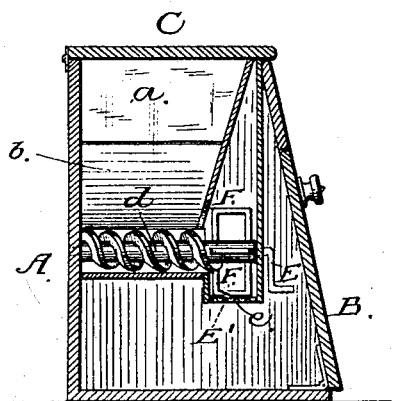
Figure 4:
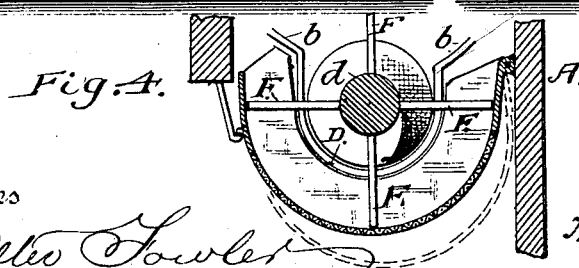

Figure 1 is a perspective view of a flour and meal bin with my improvements attached. Fig. 2 is a vertical section of same on the line *x x*. Fig. 3 is the same on the line *y y*. Fig. 4 are details to be referred to.

My present invention relates to the construction of portable flour and meal bins; and it consists in the combination and arrangement of the several devices hereinafter explained and claimed.

To enable others skilled in the art to make and use my invention, I will proceed to describe the manner in which I have carried it out.

In the drawings, A represents the outer casing of the bins; B, a hinged door, which can be let down to form a table; and C, the cover of the bins. The space included within the casing A is divided by the partition *a* into the two compartments or bins *b b*, each bin being laterally contracted or curved toward its bottom until it terminates in the semicircular or nearly semicircular spout D, in which is journaled the spirally-grooved shaft *d*, operated by means of the crank-arm E. The spout D does not extend quite the whole length of the bottom of the bin, but a space is left through which the flour or meal is fed by the shaft *d* into the semicircular chamber E', whence it passes through the sieves *e* into receptacles placed beneath the sieves.

The spiral groove or worm on the shaft *d* extends only to the edge of the chamber E', and the portion of the shaft which extends above the chamber E is provided with the stirrers F, which reach down into the chamber E', and, revolving within the chamber, cause the flour or meal to pass through the sieves *e* and prevent the clogging of the same. These chambers E' are formed as shown in Fig. 4, and are hinged or secured in position so that they can be readily removed for cleaning. The bins may be constructed with suitable legs, if desired, or they may be placed on a stand or shelf.

The operation of my invention is as follows: The bins having been supplied with a proper quantity of flour and meal, when it is desired to use some of either, the cook has only to place her pan or tray under the chamber E' and turn the crank-arm E. This causes the shaft *d* to revolve and feed the flour or meal, as the case may be, into the chamber, where it is caused by the stirrers F to pass through the sieves into the pan or tray.

From this description of my invention it is evident that any desired quantity may be drawn forward into the chamber E and be sifted out without disturbing the residue in the bin.

I am aware it is not broadly new to construct a kitchen-cabinet with separate flour or meal compartments within which semi-cylindrical sieves are secured; nor is it new to journal within said compartments rotating cylinders having spirally-grooved ribs. Such construction I therefore do not broadly claim as my invention.

Having thus described my invention, what I claim as new, and desire to secure by Letters Patent, is—

A portable flour and meal bin consisting, essentially, of the casing A, having compartments *b b*, provided with contracted curved bottoms, the spouts D in said bottoms, the spirally-grooved shafts in said spouts, the chambers E', the bottoms of which are hinged to the casing and provided with the sieves *e*, and the stirrers F on the ends of the shafts and within the hinged chambers, substantially as herein described.

THOMAS JEFFERSON COX.

Witnesses:
L. D. TIPTON,
R. SAILLS.